Inventor
ROGER A. BUTTERY

# United States Patent Office 3,446,152
Patented May 27, 1969

3,446,152
SEAL ASSEMBLIES
Roger A. Buttery, Ferring, Sussex, England, assignor to Quickfit & Quartz Limited, Stone, Staffordshire, England, a corporation of Great Britain
Filed Jan. 16, 1967, Ser. No. 609,492
Claims priority, application Great Britain, Jan. 17, 1966, 57,689/66
Int. Cl. F04d 29/10; F16j 15/16; F16k 41/00
U.S. Cl. 103—111                                    7 Claims

ABSTRACT OF THE DISCLOSURE

A seal assembly for sealing a rotatable shaft in a non-rotatable member, the seal assembly comprising a sleeve for said shaft, said sleeve having first and second end portions joined by an axially compressible central portion, the first end portion of the said sleeve being a fluid-tight fit on said shaft, a resilient member for urging a sealing surface on the second end portion of the sleeve into sliding sealing engagement with a surface on the non-rotatable member, and coupling means for connecting said second end portion and said shaft to driving means for rotating the sleeve and the shaft about their respective longitudinal axes.

---

This invention relates to a seal assembly for sealing relatively rotatable members and more particularly, but not exclusively, to the sealing of an impeller shaft in a pump housing.

The present invention provides a seal assembly for sealing a rotatable shaft in a non-rotatable member, the seal assembly comprising a sleeve for said shaft, said sleeve having first and second end portions joined by an axially compressible central portion, the first end portion of the said sleeve being a fluid-tight fit on said shaft, a resilient member for urging a sealing surface on the second end portion of the sleeve into sealing engagement with a surface on the non-rotatable member, and coupling means for connecting said second end portion and said shaft to driving means for rotating the sleeve and the shaft about their respective longitudinal axes.

Preferably, said coupling means comprises a first driving member for connecting said second end portion to said driving means and a second driving member for connecting said shaft to said driving means. The first driving member may be a cylindrical member having at one end a plurality of inwardly directed radial pins which engage in cooperating longitudinal slots in said second end portion of said sleeve, the other end of said cylindrical member being adapted for connection to said driving means.

Advantageously, the cylindrical member acts as a housing for said resilient member which may be a helical spring one end of which spring bears against a retaining member which abuts said second end portion of said sleeve and the other end of the spring bears against a radial flange on said second driving member.

The seal assembly according to the present invention is of particular use in sealing an impeller shaft in the housing of a pump particularly a pump made of glass or a ceramic material, for pumping corrosive liquids.

According to this aspect of the invention therefor there is provided a pump comprising a pump housing, an impeller for rotation in said housing and an impeller shaft sealed in said housing by a seal assembly comprising a sleeve for said shaft, said sleeve having first and second end portions joined by an axially compressible central portion, the first end portion of said sleeve being a fluid-tight fit on said shaft, a resilient member urging a sealing surface on the second end portion of the sleeve into sealing engagement with a surface on the pump housing, a first driving member for connecting said second end portion to driving means and a second driving member for connecting said shaft to said driving means for rotating the sleeve and said shaft about their respective longitudinal axes.

In order that the invention may be more fully understood an embodiment in accordance therewith will now be described by way of example with reference to the accompanying drawings in which.

Figure 1:
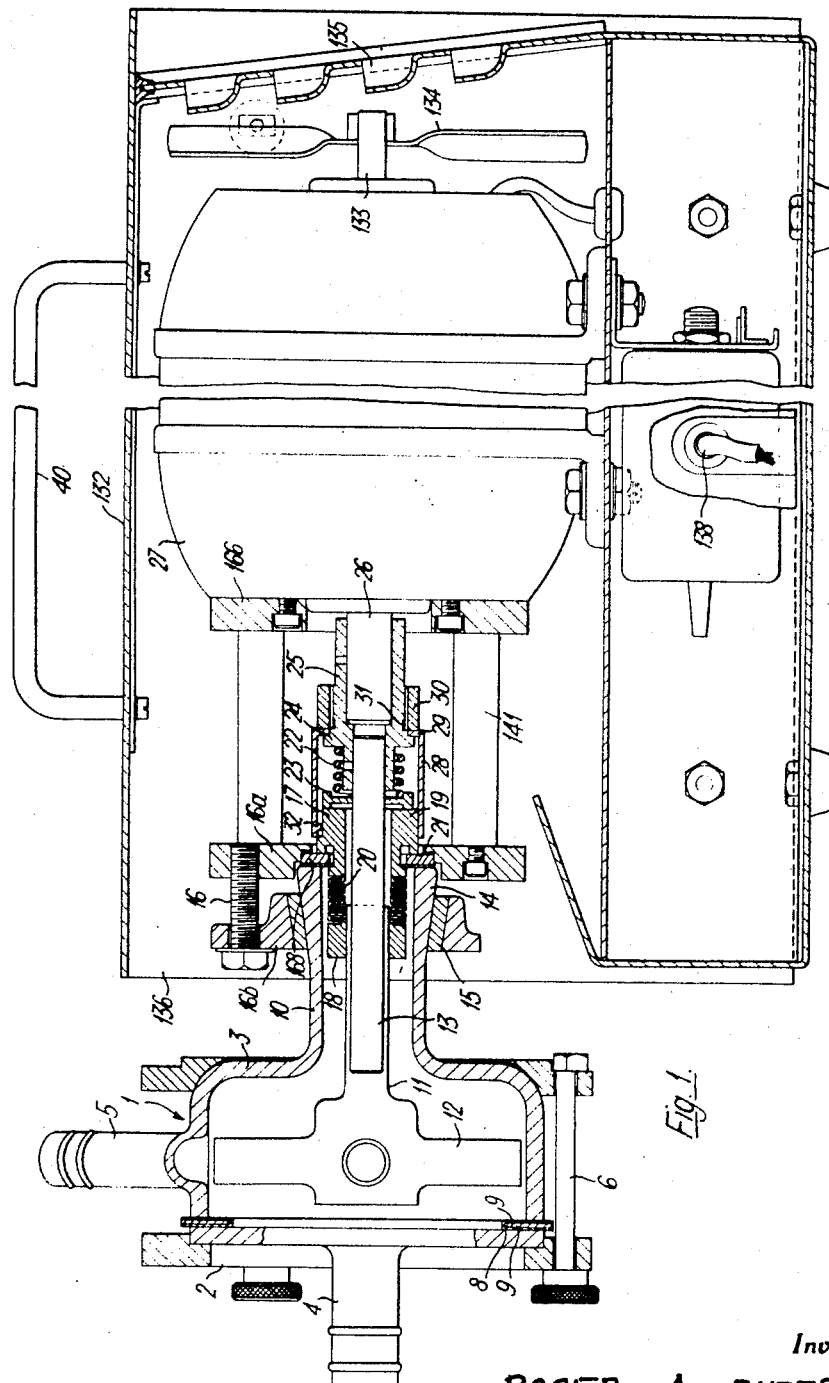
FIG. 1 is a cross section through a pump incorporating a seal assembly constructed according to the present invention.
Figure 2:
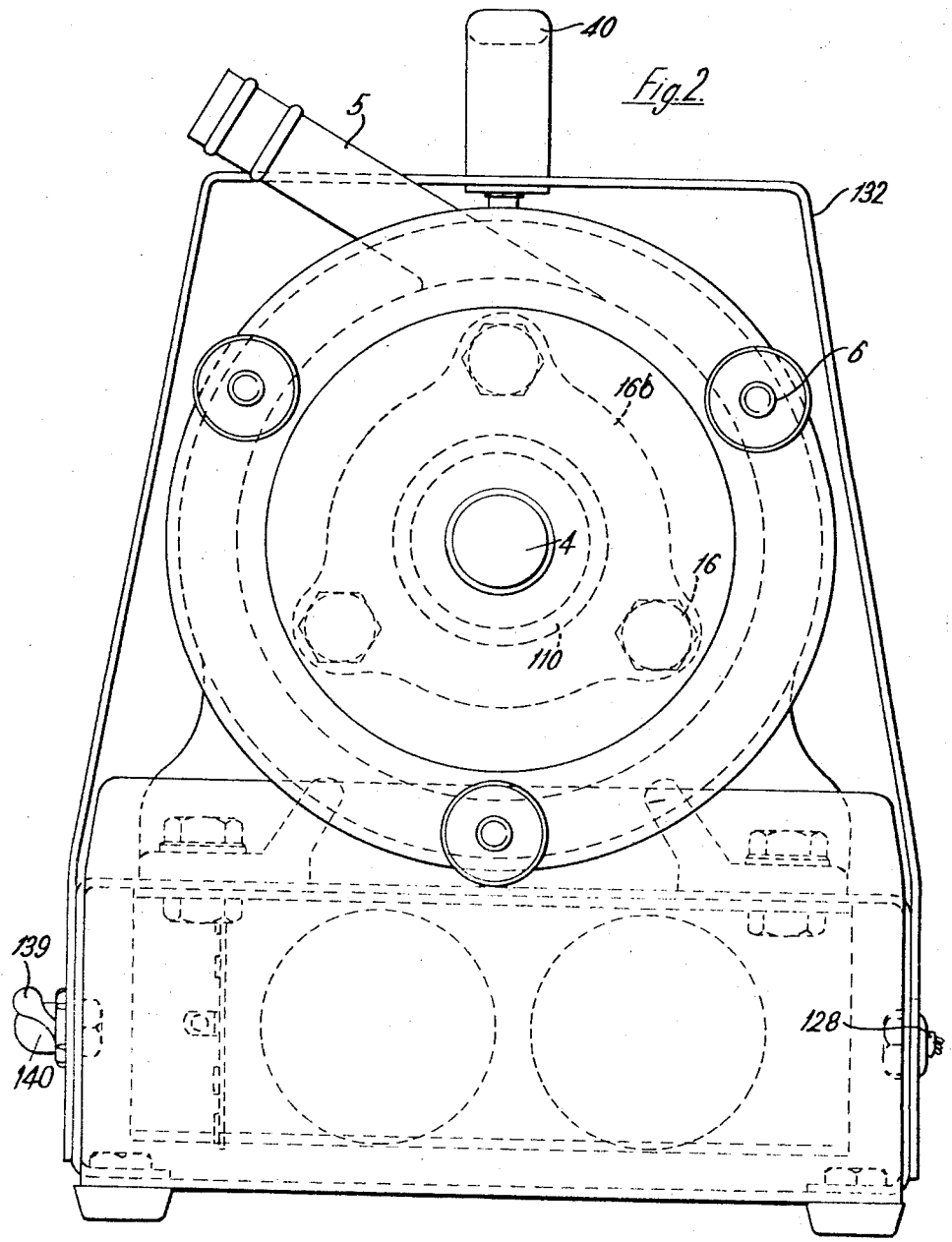
FIG. 2 is an end elevation of the pump of FIG. 1, looking from the left in FIG. 1.
Figure 3:
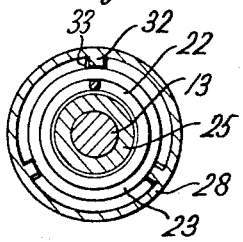
FIG. 3 is a diagrammatic cross section along the lines 11—11 of FIG. 1.

Referring to the drawings there is shown a pump for pumping corrosive liquids comprising a pump housing shown generally at 1 having two casing portions 2 and 3, the portion 2 having an inlet port 4 for the corrosive liquid and the portion 3 having an outlet port 5 for the corrosive liquid. The portions 2 and 3 are clamped together by a number of clamps 6 spaced round the peripheral portion of the casing, a sealing gasket 7 being interposed between the co-operating surfaces 8 and 9 respectively of the portions 2 and 3.

The portion 3 of the housing 1 is formed with a co-axial sleeve 10 through which passes in spaced relation thereto a shaft 11 of a pump impeller 12 disposed to be rotated within the housing 1 by the shaft 11 from a prime mover. The housing 1, impeller 12 and impeller shaft 11 are each formed from glass preferably borosilicate glass. The shaft 11 is reinforced by an internal metal shaft 13 which is bonded thereto with a suitable adhesive. The extension 10 is formed with a frusto-conical end 14 and a co-axial sealing ring 15 preferably of porcelain is clamped thereto by clamping bolts 16 passing through spaced apertures in co-operating flanges 16a, 16b. Rods 141 are secured to the flange 16a and to the end plate 166 of a motor 27 to be described thereby preventing the casing rotating with the shaft 11.

The shaft 13 is received in a sleeve 17 formed of a synthetic resin material having a low coefficient of friction and having a first end portion 18 which is a fluid-tight push fit on the shaft 11, and a second end portion 19 which is joined to the first end portion 18 by a bellows 20 so that the middle portion of the sleeve 17 is axially compressible.

The end portion 19 is formed with a sealing surface 21 which is urged into sliding sealing engagement with the stationary gasket 168 by a helical compression spring 22, one end of which bears against a retaining member 23 which abuts the end portion 19. The other end of the spring 22 bears against a radial flange 24 on a driving member 25 secured to the shaft 13 which driving member 25 couples the shaft 13 to the shaft 26 of an electric motor 27.

A cylindrical metal housing 28 for the spring 22 having an inturned end flange 29 is connected to the driving member 25 by a circular clamp 30 which sandwiches the flange 29 in a slot 31 in the flange 24 of the driving member 25. The other end of the housing 28 is formed with three inwardly directed pins 32 engaged in three co-operating longitudinal slots 33 equi-spaced around the peripheral portion of the end portion 19 so that the housing 28 acts as a driving member for connecting the end portion 19 to the shaft 26 of the electric motor 27.

Rotation of the shaft 26 thus causes the shaft 13 and sleeve 17 to rotate as a unit. Torsional stress on the sleeve 17, particularly on the bellows portion 20, is thereby avoided, and a direct drive is imparted to the sealing surface 21 which slides over the surface of the gasket 168.

Preferably, the sealing surface 21 is formed from glass-reinforced synthetic resin having a low co-efficient friction for maximum resistance to wear. Furthermore, the glass shaft 11 is ground concentric with the steel shaft 13 after the latter has been bonded therein to give a free running mounting for the bellows, thus avoiding excessive flexing of the bellows. The bellows portion 20 of the sleeve 17 is capable of absorbing radial vibrations so that transmissions of radial vibrations from the shaft 13 to the sealing face 21 is prevented.

It will be appreciated that the corrosive liquid which enters the pump via the inlet port 4 and is discharged through the outlet port 5 will come into contact only with glass, porcelain and synthetic resin.

Furthermore, any axial displacement of the shaft 13 will be accommodated by the bellows portion 20 of the sleeve 17. Thus the end portion 18 will not move relative to the shaft 11 and passage of corrosive liquid therebetween is thereby prevented.

The prime mover for the pump comprises the electric motor 27 mounted in a casing 132 and the free end of the motor shaft 133 has a fan 134 fast therewith whereby cooling air is drawn in through louvers 135 in the end casing wall and, after flowing past the motor, leaves the open end 136 of the casing. The left hand end of the motor 27 in FIG. 1, has the bolts 16 secured to it as already described thereby supporting the pump 1. Additional supports for the pump may be provided, for example, one or both of the flanges 16a, 16b may have stays connecting them to the motor casing 132. The electric current supply to the motor is through a cable 138 and a switch 139 may be provided as shown for switching on the motor at the casing 132, and a current volume control 140 may be provided. The casing may have a carrying handle 40 as shown so that it may be easily carried and transported, the whole pump and motor assembly thus forming a self-contained unit.

What is claimed:

1. A seal assembly for sealing a driven rotatable shaft in a non-rotatable member with coupling means for drivingly connecting said shaft to driving means, the seal assembly comprising a sleeve for said shaft, said sleeve having first and second end portions joined by an axially compressible central portion, the first end portion of the said sleeve being a fluid-tight fit on said shaft, a resilient member operatively connected to the second end portion to compress the compressible means and to urge a sealing surface on the second end portion of the sleeve into sliding sealing engagement with a surface on a portion of the non-rotatable member surrounding said sleeve, and said coupling means connecting said second end portion and said shaft to said driving means for rotating the sleeve and the shaft about their respective longitudinal axes.

2. A seal assembly according to claim 1 wherein said coupling means comprises a first driving member for connecting said second end portion to said driving means and a second driving member for connecting said shaft to said driving means.

3. A seal assembly according to claim 2 wherein the first driving member is a cylindrical member having at one end a plurality of inwardly directed radial pins which engage in co-operating longitudinal slots in said second end portion of said sleeve, the other end of said cylindrical member being adapted for connection to said driving means.

4. A seal assembly according to claim 3 wherein said second driving member has a radial flange and said cylindrical member acts as a housing for said resilient member, a retaining member abutting said second end portion of said sleeve, said resilient member comprising a helical spring one end of which bears against said retaining member and the other end of which bears against said radial flange.

5. A pump comprising a pump housing, an impeller for rotation in said housing and a driven impeller shaft sealed in said housing by a seal assembly comprising a sleeve for said shaft, said sleeve having first and second end portions joined by an axially compressible central portion, the first end portion of said sleeve being a fluid-tight fit on said shaft, a resilient member urging a sealing surface on the second end portion of the sleeve into sealing engagement with a surface on the pump housing, a first portion and a second driving means engaging said first driving means and drivingly connected with a drive shaft for rotating the sleeve and said shaft as a unit.

6. In a pump assembly of the type having a casing provided with an annular sealing face, an impeller in said casing and including a driven shaft projecting outwardly of said casing through and beyond said annular sealing face, a prime mover having a drive shaft axially aligned with the impeller shaft, and a coupling member connecting said shafts, the improvement comprising:
   a sealing sleeve having a first end portion in fluid-tight fitting relation to said impeller shaft within said casing, a second end portion lying at least partially outside said casing out of direct contact with said impeller and in annular sealing contact with said annular sealing face, and an intermediate axially compressible portion joining said end portions to allow said second end portion to float axially with respect to said first end portion to maintain sealing contact with said sealing face,
   means for resiliently urging said second end portion axially against said sealing face, and
   drive means for connecting said second end portion directly to said drive shaft for rotation in unison with both said shafts whereby torsional loading of said intermediate portion incidental to pump drive is obviated.

7. In the pump assembly as defined in claim 6 wherein said drive means comprises a sleeve connected to said coupling member and drivingly connected to said second end portion for axial sliding movement relative thereto.

References Cited

UNITED STATES PATENTS

| 2,337,639 | 12/1943 | Brummer | 277—89 |
| 2,426,047 | 8/1947 | Payne. | |
| 2,447,663 | 8/1948 | Payne | 277—89 |

FOREIGN PATENTS 901,160   8/1962   Great Britain.

HENRY F. RADUAZO, Primary Examiner.

U.S. Cl. X.R.

277—89, 37; 103—114